(12) United States Patent
Omura (10) Patent No.: US 12,388,137 B2
(45) Date of Patent: Aug. 12, 2025

(54) POWER STORAGE MODULE

(71) Applicant: Prime Planet Energy & Solutions, Inc., Tokyo (JP)

(72) Inventor: Tetsuji Omura, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 579 days.

(21) Appl. No.: 17/714,149

(22) Filed: Apr. 6, 2022

(65) Prior Publication Data
US 2022/0328923 A1    Oct. 13, 2022

(30) Foreign Application Priority Data
Apr. 8, 2021  (JP) ................. 2021-065759

(51) Int. Cl.
| | | |
|---|---|---|
| H01M 50/209 | (2021.01) | |
| H01M 10/04 | (2006.01) | |
| H01M 50/224 | (2021.01) | |
| H01M 50/258 | (2021.01) | |
| H01M 50/264 | (2021.01) | |
| H01M 50/291 | (2021.01) | |

(52) U.S. Cl.
CPC ..... *H01M 50/209* (2021.01); *H01M 10/0481* (2013.01); *H01M 50/224* (2021.01); *H01M 50/258* (2021.01); *H01M 50/264* (2021.01); *H01M 50/291* (2021.01)

(58) Field of Classification Search
None
See application file for complete search history.

(56) References Cited

U.S. PATENT DOCUMENTS

| | | |
|---|---|---|
| 2009/0111010 A1 | 4/2009 | Okada et al. |
| 2011/0151312 A1 | 6/2011 | Kim |
| 2014/0087231 A1* | 3/2014 | Schaefer .......... H01M 10/6554 429/120 |
| 2015/0125720 A1* | 5/2015 | Fujii ................ H01M 50/209 429/56 |
| 2017/0005313 A1 | 1/2017 | Ogawa et al. |
| 2018/0294503 A1* | 10/2018 | Hoefler ............. H01M 50/227 |
| 2019/0006644 A1* | 1/2019 | Sakurai ............ H01M 50/209 |
| 2019/0221795 A1* | 7/2019 | Fujishima ......... H01M 50/211 |
| 2020/0099027 A1 | 3/2020 | Ishibashi et al. |
| 2021/0184302 A1 | 6/2021 | Zhou et al. |
| 2024/0186639 A1* | 6/2024 | Oberhoffer ........ H01M 50/209 |

FOREIGN PATENT DOCUMENTS

| | | |
|---|---|---|
| CN | 106450090 A | 2/2017 |
| CN | 109148754 A | 1/2019 |
| CN | 209786004 U | 12/2019 |
| CN | 211350711 U | 8/2020 |
| JP | 2009110833 A | 5/2009 |
| JP | 2010-225339 A | 10/2010 |
| JP | 2010-244894 A | 10/2010 |

(Continued)

*Primary Examiner* — Robert S Carrico
(74) *Attorney, Agent, or Firm* — HAUPTMAN HAM, LLP (57) ABSTRACT

A power storage module includes: a plurality of stacked power storage cells; and a plurality of seamless loop-shaped metal members. Each of the plurality of seamless loop-shaped metal members is fitted on the plurality of power storage cells in a stacked state so as to surround and hold the plurality of power storage cells in a stacking direction.

6 Claims, 6 Drawing Sheets

(56) References Cited

FOREIGN PATENT DOCUMENTS

| | | |
|---|---|---|
| JP | 2011134699 A1 | 7/2011 |
| JP | 2012-123983 A | 6/2012 |
| JP | 2013-51048 A | 3/2013 |
| JP | 2017-16856 A | 1/2017 |
| JP | 2017-134953 A | 8/2017 |
| JP | 2019-9086 A | 1/2019 |
| JP | 2019-169270 A | 10/2019 |
| WO | 2018235556 A1 | 12/2018 |
| WO | 2020/026961 A1 | 2/2020 |

* cited by examiner

POWER STORAGE MODULE

This nonprovisional application is based on Japanese Patent Application No. 2021-065759 filed on Apr. 8, 2021, with the Japan Patent Office, the entire contents of which are hereby incorporated by reference.

BACKGROUND OF THE INVENTION

Field of the Invention

The present technology relates to a power storage module.

Description of the Background Art

Japanese Patent Laying-Open No. 2011-134699 is a prior art document that discloses a configuration of a battery module. The battery module described in Japanese Patent Laying-Open No. 2011-134699 includes a battery unit, an end plate, and a fixation band. In the battery unit, a plurality of batteries are connected. The end plate is installed at an end portion of the battery unit. The fixation band surrounds and fixes an assembly of the battery unit and the end plate. The fixation band is contracted after thermal expansion and tightens the battery unit and the end plate. The fixation band includes a coupling portion obtained by coupling both ends thereof to each other to form a closed-loop shape.

When a restraint member for a plurality of power storage cells has a connection portion, an operation of connecting the restraint member is required, and the connection portion is a portion with the weakest strength in the restraint member, with the result that restraint force obtained by the restraint member for the plurality of power storage cells is limited by the strength of the connection portion.

SUMMARY OF THE INVENTION

An object of the present technology is to provide a power storage module to restrain a plurality of power storage cells with high restraint force by increasing strength of a restraint member while eliminating need of an operation of connecting the restraint member.

A power storage module according to the present technology includes: a plurality of stacked power storage cells; and a plurality of seamless loop-shaped metal members. Each of the plurality of seamless loop-shaped metal members is fitted on the plurality of power storage cells in a stacked state so as to surround and hold the plurality of power storage cells in the stacking direction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms "comprise", "include", and "have" are open-end terms. That is, when a certain configuration is included, a configuration other than the foregoing configuration may or may not be included. Further, the present technology is not limited to one that necessarily exhibits all the functions and effects stated in the present embodiment.

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate. The term "current collecting portion" may collectively represent a positive electrode current collecting member and a negative electrode current collecting member.

In the present specification, the "power storage cell" or the "power storage module" is not limited to a battery cell or a battery module, and may include a capacitor cell or a capacitor module.

First Embodiment

Figure 1:
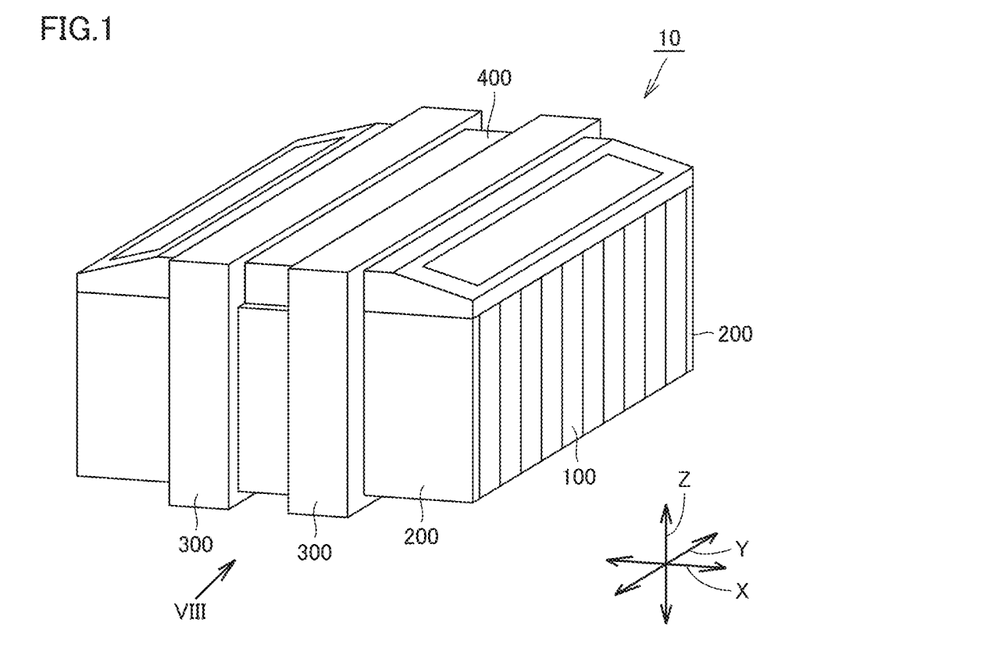
FIG. 1 is a diagram showing a basic configuration of a battery pack.
Figure 2:
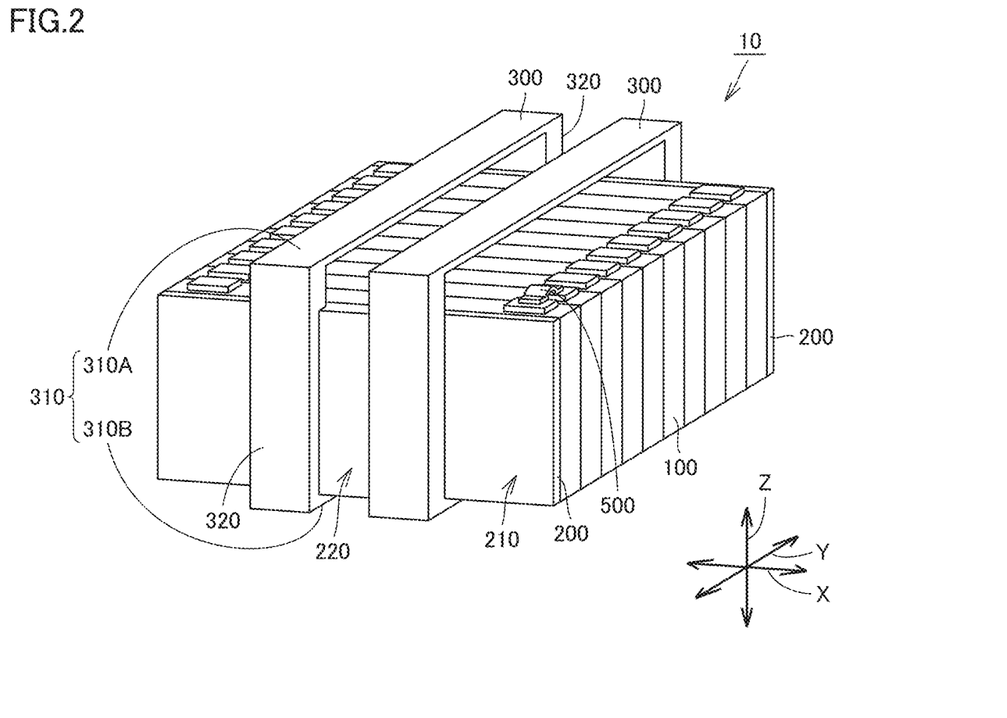
FIG. 2 is a diagram showing a state in which a resin plate of the battery pack of FIG. 1 is removed.
Figure 3:
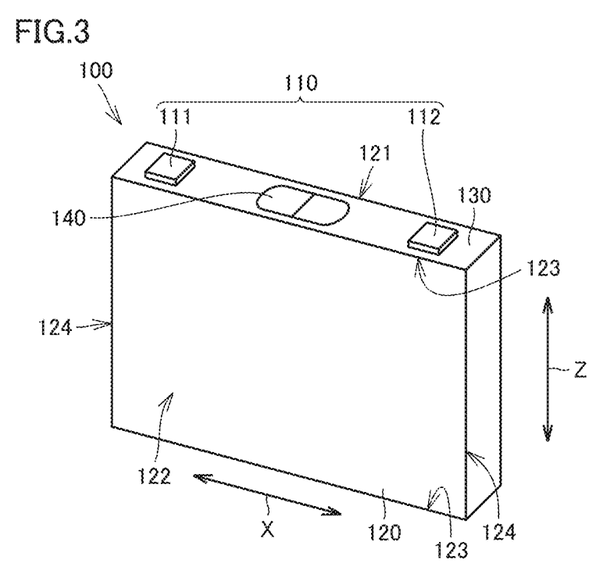
FIG. 3 is a diagram showing a configuration of a battery cell in the battery pack.

FIG. 1 is a diagram showing a basic configuration of a battery pack. FIG. 2 is a diagram showing a state in which a resin plate of the battery pack of FIG. 1 is removed. FIG. 3 is a diagram showing a configuration of a battery cell in the battery pack.

As shown in FIGS. 1 to 3, a battery pack 10 serving as an exemplary "power storage module" includes battery cells 100, end plates 200, seamless loop-shaped metal members 300, and a resin plate 400. It should be noted that battery pack 10 may not necessarily include end plates 200.

As shown in FIGS. 1 and 2, the plurality of battery cells 100 are provided side by side in a Y axis direction (arrangement direction). Thus, a stack of battery cells 100 is formed. A separator (not shown) is interposed between battery cells 100.

As shown in FIG. 3, battery cell 100 includes an electrode terminal 110, a housing, and a gas discharge valve 140. The housing is constituted of: an exterior package 120 provided with an opening 121; and a sealing plate 130 that seals opening 121.

The housing is formed to have a substantially rectangular parallelepiped shape. Specifically, the housing of each of the plurality of battery cells 100 has a main surface 122 having a rectangular shape constituted of a pair of long sides 123 and a pair of short sides 124 when viewed in the Y axis direction (stacking direction). An electrode assembly (not shown) and an electrolyte solution (not shown) are accommodated in the housing.

Electrode terminal 110 includes a positive electrode terminal 111 and a negative electrode terminal 112. Electrode terminal 110 is formed on sealing plate 130. Gas discharge valve 140 is formed on sealing plate 130 at an intermediate position between positive electrode terminal 111 and negative electrode terminal 112. Gas discharge valve 140 is fractured when pressure in the housing becomes more than or equal to a threshold value. Thus, combustible gas in the housing is discharged to outside of the housing.

As shown in FIG. 2, electrode terminals 110 adjacent to each other in the Y axis direction (stacking direction) are electrically connected to each other by a bus bar 500. Thus, the plurality of battery cells 100 are electrically connected in series or in parallel.

As shown in FIGS. 1 and 2, end plates 200 are disposed beside the both ends of battery pack 10 in the Y axis direction (stacking direction). That is, end plates 200 are disposed beside the both sides of the plurality of battery cells 100 in the Y axis direction (stacking direction).

Two end plates 200 cover respective main surfaces 122 of two battery cells 100 located at the both ends of the plurality of battery cells 100 in the Y axis direction (stacking direction).

Figure 4:
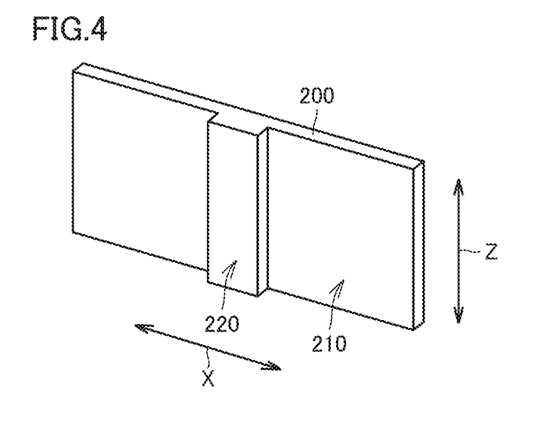
FIG. 4 is a diagram showing a configuration of an end plate according to a first embodiment.

FIG. 4 is a diagram showing a configuration of each end plate according to the first embodiment. As shown in FIGS. 1, 2, and 4, end plate 200 according to the first embodiment has a flat plate portion 210 and a protrusion 220. Flat plate portion 210 extends in a width direction (X axis direction) and an upward/downward direction (Z axis direction) of battery pack 10, and has a rectangular parallelepiped outer shape. Protrusion 220 is formed at the central portion in the X axis direction on a surface of flat plate portion 210 opposite to the side of flat plate portion 210 to be in contact with battery cell 100, and extends in the Z axis direction. Protrusion 220 has a rectangular parallelepiped outer shape.

Figure 5:
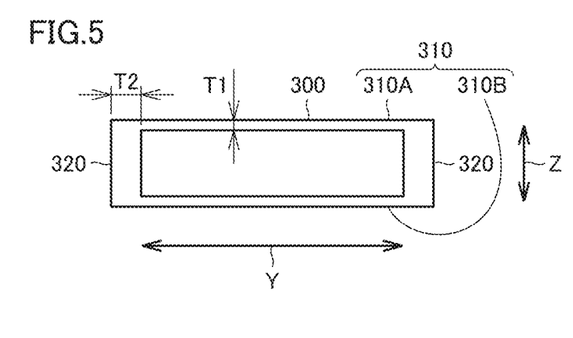
FIG. 5 is a diagram showing a configuration of a seamless loop-shaped metal member according to the first embodiment.

FIG. 5 is a diagram showing a configuration of each seamless loop-shaped metal member according to the first embodiment. As shown in FIGS. 1, 2, and 5, seamless loop-shaped metal member 300 has a rectangular loop shape. Specifically, seamless loop-shaped metal member 300 includes: a pair of first side portions 310 extending in the Y axis direction (stacking direction); and a pair of second side portions 320 extending in a direction orthogonal to the Y axis direction (stacking direction) so as to connect the pair of first side portions 310 to each other.

Thickness T2 of each of the pair of second side portions 320 is thicker than thickness T1 of each of the pair of first side portions 310. In the present embodiment, the thickness of a first side portion 310A of the pair of first side portions 310 on the sealing plate 130 side of each of the plurality of battery cells 100 is the same as the thickness of a first side portion 310B of the pair of first side portions 310 on the bottom portion side of exterior package 120 of each of the plurality of battery cells 100.

Figure 6:
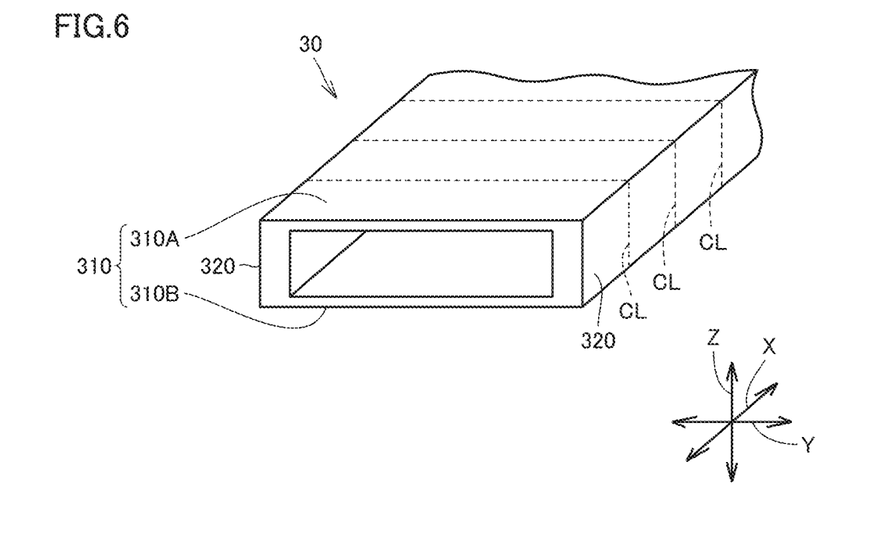
FIG. 6 is a diagram showing a state of forming a seamless loop-shaped metal member.

FIG. 6 is a diagram showing a state of forming the seamless loop-shaped metal member. As shown in FIG. 6, the plurality of seamless loop-shaped metal members 300 are formed from an extruded metal pipe 30 by cutting along cut lines CL. Each of seamless loop-shaped metal members 300 is a loop-shaped member with no ends. Seamless loop-shaped metal member 300 is composed of a metal such as aluminum or an iron/steel material.

Figure 7:
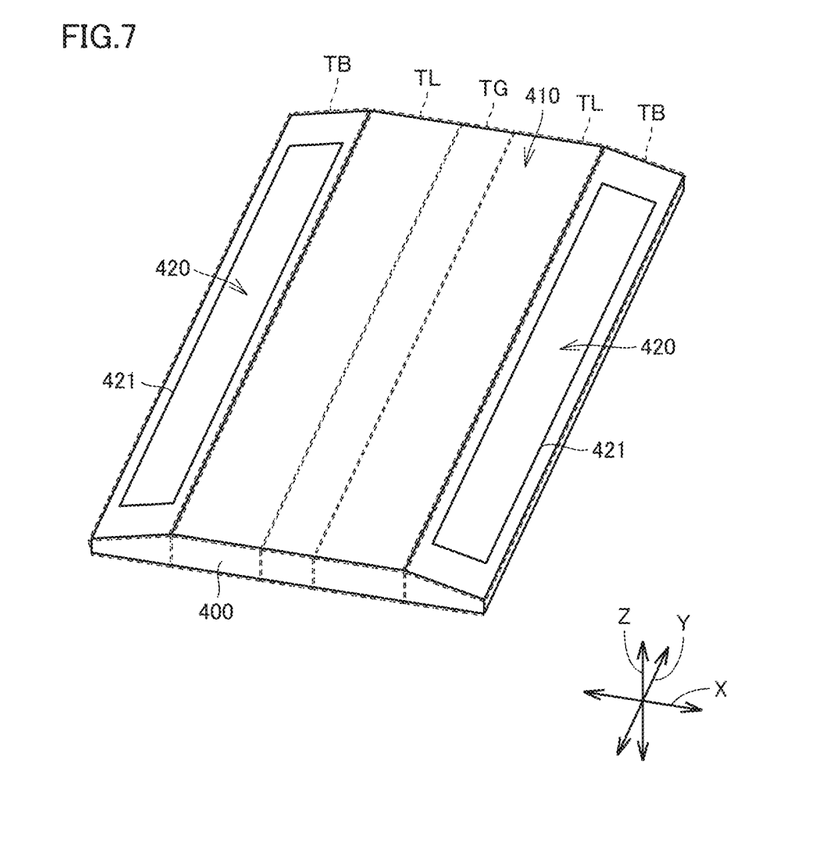
FIG. 7 is a diagram showing a configuration of a resin plate according to the present embodiment.

FIG. 7 is a diagram showing a configuration of the resin plate according to the present embodiment. As shown in FIGS. 1 and 7, resin plate 400 is disposed above the plurality of battery cells 100. A plurality of functionally divided spaces are formed between resin plate 400 and the plurality of battery cells 100.

Specifically, a gas duct area TG serving as a flow path for combustible gas discharged from gas discharge valve 140 is formed at the central portion in the width direction (X axis direction). In the width direction (X axis direction), wiring areas TL in each of which a wiring electrically connected to each of the plurality of battery cells 100 is disposed are formed beside the both sides of gas duct area TG. Bus bar areas TB in each of which bus bar 500 is disposed are formed on the outer sides with respect to two wiring areas TL in the width direction (X axis direction).

In resin plate 400, a top surface 410 located in gas duct area TG and wiring areas TL is a flat surface, and top surfaces 420 located in bus bar areas TB are surfaces inclined downward. Each of top surfaces 420 is provided with an opening/closing portion 421 that can be opened and closed when attaching bus bar 500 to the plurality of battery cells 100.

Figure 8:
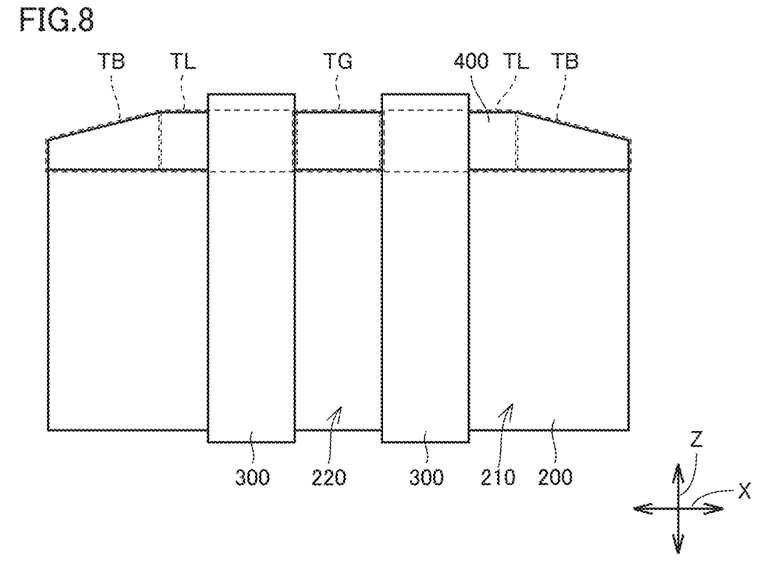
FIG. 8 is a diagram of the battery pack of FIG. 1 when viewed in a direction of arrow VIII.

FIG. 8 is a diagram of the battery pack of FIG. 1 when viewed in a direction of arrow VIII. As shown in FIGS. 1, 2, and 8, each of two seamless loop-shaped metal members 300 is fitted on the plurality of battery cells 100 in a stacked state with end plates 200 being interposed therebetween so as to surround and hold the plurality of battery cells 100 in the Y axis direction (stacking direction).

Specifically, seamless loop-shaped metal member 300 is engaged with end plate 200 with compressive force in the Y axis direction being applied onto the stack of the plurality of battery cells 100 and end plates 200, and then the compressive force is released, with the result that tensile force acts on seamless loop-shaped metal member 300. As a reaction thereto, seamless loop-shaped metal member 300 presses two end plates 200 in directions of bringing them closer to each other. As a result, the plurality of battery cells 100 are restrained between two end plates 200. It should be noted that the number of seamless loop-shaped metal members 300 is not limited to two, and may be three or more.

In the present embodiment, each of the pair of second side portions 320 of seamless loop-shaped metal member 300 is orthogonal to the pair of long sides 123 of battery cell 100 when viewed in the Y axis direction (stacking direction). Specifically, each of the pair of first side portions 310 of seamless loop-shaped metal member 300 extends in the Y axis direction (stacking direction), and each of the pair of second side portions 320 extends in the upward/downward direction (Z axis direction).

For assembling of two seamless loop-shaped metal members 300, one seamless loop-shaped metal member 300 is fitted onto the plurality of battery cells 100 from one side in the X axis direction, and the other seamless loop-shaped metal member 300 is fitted onto the plurality of battery cells 100 from the other side in the X axis direction. On this occasion, two seamless loop-shaped metal members 300 can be readily fitted thereon because top surfaces 420 of resin plate 400 are inclined surfaces.

Each of two seamless loop-shaped metal members 300 is fitted onto the plurality of battery cells 100 until second side portion 320 of each of two seamless loop-shaped metal members 300 is brought into contact with protrusion 220 of end plate 200. That is, protrusion 220 of end plate 200 functions as a positioning protrusion for two seamless loop-shaped metal members 300.

In the state in which each of two seamless loop-shaped metal members 300 is fitted on the plurality of battery cells 100, resin plate 400 is pressed by each of two seamless loop-shaped metal members 300 and is accordingly pressed against the plurality of battery cells 100. Thus, resin plate 400 can be suppressed from falling off due to pressure of combustible gas when the combustible gas flows into gas duct area TG.

In the state in which two seamless loop-shaped metal members 300 are assembled as shown in FIG. 8, each of two seamless loop-shaped metal members 300 is located within a range in which wiring area TL is located in the width direction (X axis direction). Therefore, after two seamless loop-shaped metal members 300 are assembled, opening/closing portions 421 can be opened and closed so as to attach bus bar 500 to the plurality of battery cells 100.

Figure 9:
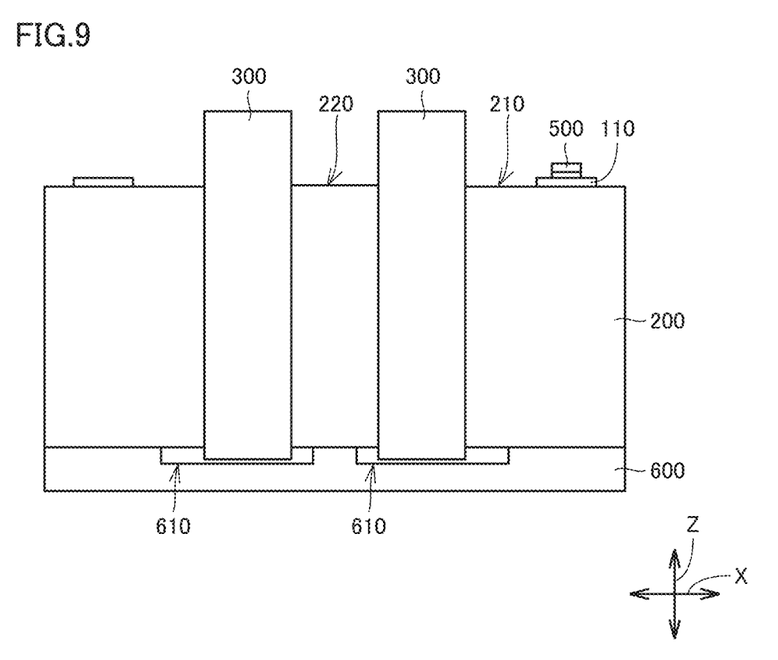
FIG. 9 is a diagram showing a positional relation between a cooling plate for cooling the battery cell and the seamless loop-shaped metal member when the cooling plate is disposed.

FIG. 9 is a diagram showing a positional relation between a cooling plate for cooling the battery cells and each of the seamless loop-shaped metal members when the cooling plate is disposed. As shown in FIG. 9, when the plurality of battery cells 100 are placed on cooling plate 600, lower portions of seamless loop-shaped metal members 300 are located in recesses 610 formed in an upper surface of cooling plate 600. Thus, the plurality of battery cells 100 can be effectively cooled by cooling plate 600.

In the power storage module according to the present embodiment, each of the plurality of seamless loop-shaped metal members 300 is fitted on the plurality of battery cells 100 in the stacked state so as to surround and hold the plurality of battery cells 100 in the Y axis direction (stacking direction). Since seamless loop-shaped metal member 300 has no connection portion, there is no need of an operation of connecting seamless loop-shaped metal member 300 serving as a restraint member and the strength of seamless loop-shaped metal member 300 can be increased, thereby restraining the plurality of battery cells 100 with high restraining force.

In the power storage module according to the present embodiment, thickness T2 of each of the pair of second side portions 320 of seamless loop-shaped metal member 300 is thicker than thickness T1 of each of the pair of first side portions 310. Thus, first side portion 310 can be thinned and reduced in weight while ensuring rigidity of second side portion 320 that exerts restraining force on the plurality of battery cells 100.

In the power storage module according to the present embodiment, each of the plurality of battery cells 100 has main surface 122 having a rectangular shape constituted of a pair of long sides 123 and a pair of short sides 124 when viewed in the Y axis direction (stacking direction), and each of the pair of second side portions 320 of seamless loop-shaped metal member 300 is orthogonal to the pair of long sides 123 of battery cell 100 when viewed in the Y axis direction (stacking direction). Thus, resin plate 400 is pressed against the plurality of battery cells 100 by seamless loop-shaped metal member 300, thereby suppressing resin plate 400 from falling off.

In the power storage module according to the present embodiment, two end plates 200 cover respective main surfaces 122 of two battery cells 100 located at the both ends in the Y axis direction (stacking direction) in the plurality of battery cells 100. Thus, the restraining force of seamless loop-shaped metal member 300 can be applied to the whole of main surface 122 of battery cell 100, thereby suppressing battery cell 100 from being expanded and deformed due to generation of heat.

In the power storage module according to the present embodiment, protrusion 220 serving as a positioning protrusion for seamless loop-shaped metal member 300 is formed on end plate 200. Thus, seamless loop-shaped metal member 300 can be disposed at a certain position in battery pack 10. For example, seamless loop-shaped metal member 300 can be disposed within a range in which wiring area TL is located in the width direction (X axis direction). It should be noted that a protrusion for positioning two seamless loop-shaped metal members 300 may be provided on cooling plate 600 by fitting two seamless loop-shaped metal members 300 on battery pack 10 and cooling plate 600, i.e., by employing a configuration in which cooling plate 600 is disposed inside two seamless loop-shaped metal members 300.

In the power storage module according to the present embodiment, seamless loop-shaped metal member 300 is formed from extruded metal pipe 30 by cutting along cut lines CL. Thus, the plurality of seamless loop-shaped metal members 300 each having the same shape can be readily manufactured.

Second Embodiment

Hereinafter, a power storage module according to a second embodiment will be described with reference to figures. Since the power storage module according to the second embodiment is different from the power storage module according to the first embodiment in terms of the configuration of each of the end plate and the seamless loop-shaped metal member, only the difference will be described and the same configurations as those of the power storage module according to the first embodiment will not be described repeatedly.

Figure 10:
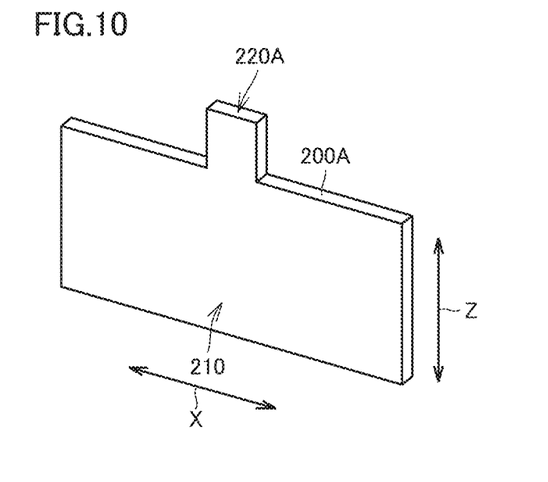
FIG. 10 is a diagram showing a configuration of an end plate according to a second embodiment.

FIG. 10 is a diagram showing a configuration of an end plate according to a second embodiment. As shown in FIG. 10, an end plate 200A according to the second embodiment has a flat plate portion 210 and a protrusion 220A. Protrusion 220A is formed at the central portion of the upper surface of flat plate portion 210 in the X axis direction and extends in the Z axis direction. Protrusion 220A has a rectangular parallelepiped outer shape.

Figure 11:
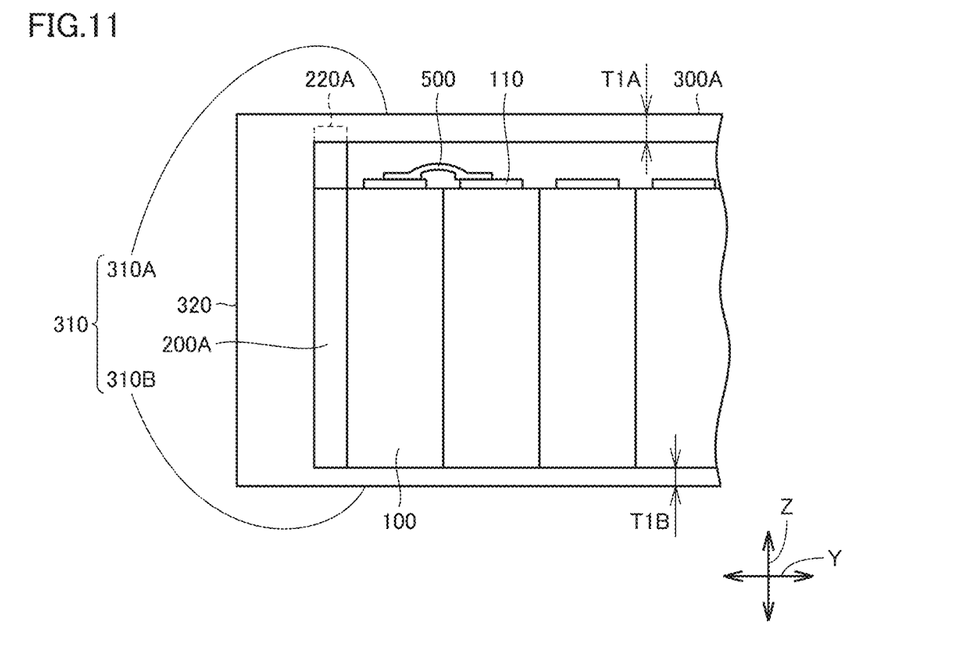
FIG. 11 is a diagram showing a state in which a resin plate of a battery pack according to the second embodiment is removed.

FIG. 11 is a diagram showing a state in which a resin plate of the battery pack according to the second embodiment is removed. As shown in FIG. 11, thickness T1A of first side portion 310A of the pair of first side portions 310 of seamless loop-shaped metal member 300A according to the second embodiment on the sealing plate 130 side of each of the plurality of battery cells 100 is thicker than thickness T1B of first side portion 310B of the pair of first side portions 310 of seamless loop-shaped metal member 300A according to the second embodiment on the bottom portion side of exterior package 120 of each of the plurality of battery cells 100.

For assembling of two seamless loop-shaped metal members 300A, each of two seamless loop-shaped metal members 300A is fitted onto the plurality of battery cells 100 until first side portion 310A of each of two seamless loop-shaped metal members 300A is brought into contact with protrusion 220A of end plate 200A. That is, protrusion 220A of end plate 200A functions as a positioning protrusion for two seamless loop-shaped metal members 300A. It should be noted that as the configuration for positioning two seamless loop-shaped metal members 300A, a protrusion for positioning two seamless loop-shaped metal members 300A may be provided on a bus bar holder for holding bus bar 500, the bus bar holder being disposed on the upper surface of battery pack 10.

In the power storage module according to the present embodiment, thickness T1A of first side portion 310A on the sealing plate 130 side of each of the plurality of battery cells 100 is thicker than thickness T1B of first side portion 310B on the bottom portion side of exterior package 120 of each of the plurality of battery cells 100. Thus, flexural rigidity of first side portion 310A separated from the plurality of battery cells 100 can be increased, thereby suppressing flexural deformation of seamless loop-shaped metal member 300A due to reaction force received from the plurality of battery cells 100. As a result, the plurality of battery cells 100 can be restrained by seamless loop-shaped metal member 300A with high restraining force, thereby suppressing battery cells 100 from being expanded and deformed due to generation of heat.

Figure 12:
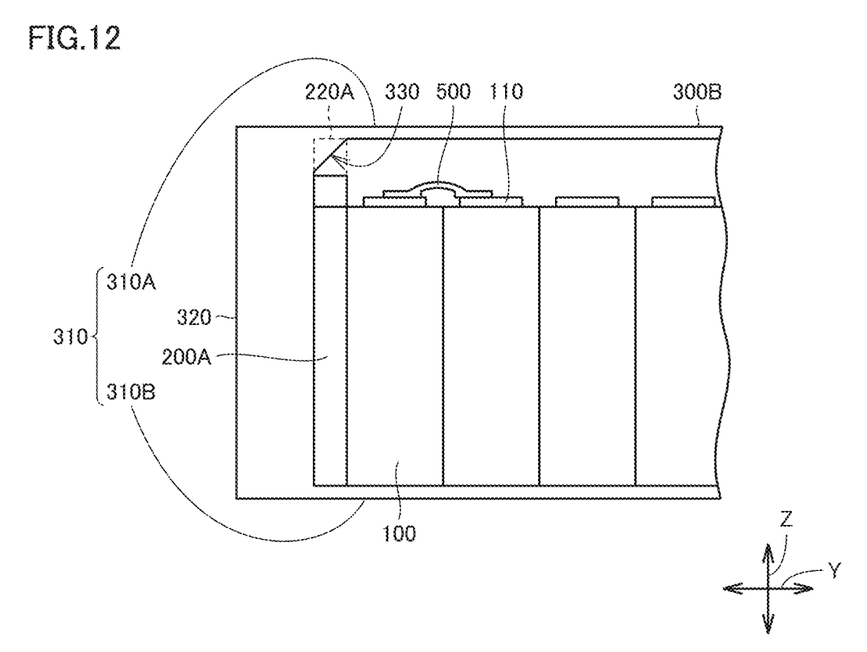
FIG. 12 is a diagram showing a state in which a resin plate of a battery pack according to a modification of the second embodiment is removed.

FIG. 12 is a diagram showing a state in which a resin plate of a battery pack according to a modification of the second embodiment is removed. As shown in FIG. 12, in a seamless loop-shaped metal member 300B according to the modification of the second embodiment, a rib 330 is formed at a corner portion between first side portion 310A and second side portion 320. Thickness T1A of first side portion 310A may be thicker than or the same as thickness T1B of first side portion 310B.

For assembling of two seamless loop-shaped metal members 300B, each of two seamless loop-shaped metal members 300B is fitted onto the plurality of battery cells 100 until rib 330 of each of two seamless loop-shaped metal members 300B is brought into contact with protrusion 220A of end plate 200A.

In the present modification, since rib 330 is formed at the corner portion between first side portion 310A and second side portion 320, flexural rigidity of first side portion 310A can be increased, thereby suppressing flexural deformation of seamless loop-shaped metal member 300B due to reaction force received from the plurality of battery cells 100. As a result, the plurality of battery cells 100 can be restrained by seamless loop-shaped metal member 300B with high restraining force, thereby suppressing battery cells 100 from being expanded and deformed due to generation of heat.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:

1. A power storage module, comprising:
a plurality of power storage cells in a stacked state in which the plurality of power storage cells is stacked on each other in a stacking direction;
a plurality of seamless loop-shaped metal members fitted on the plurality of power storage cells in the stacked state so as to surround and hold the plurality of power storage cells in the stacking direction of the plurality of power storage cells; and
a resin plate disposed above the plurality of power storage cells, in a state in which the plurality of seamless loop-shaped metal members is fitted on the plurality of power storage cells and the resin plate is pressed, by the plurality of seamless loop-shaped metal members, against the plurality of power storage cells, wherein
a plurality of divided spaces is between the resin plate and the plurality of power storage cells, and
the plurality of divided spaces extends along the stacking direction and comprises:
a gas duct area configuring a flow path for combustible gas discharged from a gas discharge valve of each of the plurality of power storage cells, and
at least one wiring area in which a wiring electrically connected to each of the plurality of power storage cells is disposed.

2. A power storage module, comprising:
a plurality of power storage cells in a stacked state in which the plurality of power storage cells is stacked on each other in a stacking direction;
a plurality of seamless loop-shaped metal members fitted on the plurality of power storage cells in the stacked state so as to surround and hold the plurality of power storage cells in the stacking direction of the plurality of power storage cells; and
a resin plate disposed above the plurality of power storage cells, in a state in which the plurality of seamless loop-shaped metal members is fitted on the plurality of power storage cells and the resin plate is pressed, by the plurality of seamless loop-shaped metal members, against the plurality of power storage cells, wherein
a plurality of divided spaces is between the resin plate and the plurality of power storage cells,
the plurality of divided spaces extends along the stacking direction and comprises:
a gas duct area configuring a flow path for combustible gas discharged from a gas discharge valve of each of the plurality of power storage cells, and
first and second wiring areas in which first and second wirings electrically connected to each of the plurality of power storage cells are disposed, respectively, and
in a width direction orthogonal to the stacking direction, the gas duct area is arranged between the first and second wiring areas.

3. The power storage module according to claim 2, wherein
the resin plate further comprises:
a top surface covering the gas duct area and the first and second wiring areas, and
a first inclined surface extending, in the width direction, from a first side of the top surface downwardly toward the plurality of power storage cells, and
a second inclined surface extending, in the width direction, from a second side of the top surface downwardly toward the plurality of power storage cells, the second side opposite to the first side in the width direction.

4. The power storage module according to claim 3, wherein
the plurality of divided spaces further comprises:
first and second bus bar areas in at least one of which a bus bar electrically connected to a pair of power storage cells among the plurality of power storage cells is disposed, and
in the width direction, the gas duct area and the first and second wiring areas are arranged between the first and second bus bar areas.

5. The power storage module according to claim 4, wherein the first and second inclined surfaces cover the first and second bus bar areas, respectively.

6. The power storage module according to claim 5, wherein
the first and second inclined surfaces comprise first and second openable and closable portions, respectively, for permitting access to the first and second bus bar areas, respectively.

* * * * *